United States Patent Office 3,387,988
Patented June 11, 1968

3,387,988
MAR RESISTANT PRODUCTS AND PROCESS
FOR MAKING SAME
Darwin Fiske De Lapp, New Canaan, Conn., and William
George Deichert, Flushing, N.Y., assignors to American
Cyanamid Company, Stamford, Conn., a corporation
of Maine
No Drawing. Filed Aug. 17, 1964, Ser. No. 390,185
9 Claims. (Cl. 117—76)

ABSTRACT OF THE DISCLOSURE

A rigid plastic sheet coated with a cross-linked unsaturated polyester resin wherein said unsaturated polyester resin is bonded to the plastic sheet by a polymer of allyl methacrylate.

---

This invention relates to a plastic body having a mar-resistant surface. More particaulrly, this invention relates to a plastic body having a mar-resistant surface which is bonded to the plastic body by means of a binding agent comprising a substantially linear polymer of allyl methacrylate. Still further, this invention relates to the process for preparing said plastic body with a mar-resistant surface.

One of the objects of the present invention is to produce a plastic body having a mar-resistant surface securely bonded to a plastic base member. A further object of the resent invention is to secure a mar-resistant surface to a plastic base by means of a binding agent wherein the plastic base before treatment is significantly less mar-resistant than after said treatment. These and other objects of the present invention will be discussed in greater detail hereinbelow.

Many plastic bodies particurarly those prepared from thermoplastic materials have a tendency to be receptive to abrasion and, as a consequence, have a low resistance to scratching. Illustrative of these plastic bodies are objects made from poly(methyl methacrylate), polystyrene, polyvinyl chloride, and the like. In order to retain the initial outstanding characteristics of these objects, it is necessary to protect one or more of the surfaces thereof with a coating of a resinous material which is capable of being cross-linked to a thermoset condition which displays in said thermoset condition a hard, durable, scratch resistant surface.

The coating used as the mar-resistant surface on the plastic bodies of the present invention is a substantially linear, water-insoluble, non-gelled unsaturated polyester resin composition comprising a blend of (1) the esterification reaction product of reactants consisting essentially of fumaric acid and a plyethylene glycol wherein said glycol has between 6 and 26 carbon atoms, said product has an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40% by weight based on the total weight of (1) and (2).

In order to eliminate any tendency for said coating to develop a haze, especially over a wide temperature range, the aforementioned linear polyester resin composition may be further modified by adding thereto comparatively small amounts such as between about 1% and 5% by weight of a polymerizable styrene wherein said percentages by weight are based on the total weight of the glycol fumarate, the glycol diacrylate and the styrene monomer.

In the application of coating compositions such as that recited generally hereinabove, and more specifically hereinbelow, it has been found that the bonding of the mar-resistant coating to the plastic base can be significantly enhanced by treating said plastic base with a binding agent on the surface to which the mar-resistant finish is to be applied.

The binding agent is a substantially linear polymer of allyl methacrylate and is applied from a solution thereof to the plastic base followed by heating at a temperature approximating the boiling point of the solvent for the poly(allyl methacrylate) whereby the solvent is removed leaving a thin film of the poly(allyl methacrylate) securely bonded to the surface of the plastic base. It is speculated that in the preparation of the polymer of allyl methacrylate the linear polymer is developed as a result of polymerization taking place through the unsaturation found in the acrylate portion of the allyl methacrylate molecule. It is believed that little or no polymerization takes place involving the allyl groups when the linear polymer of allyl methacrylate is prepared. It is believed further that this linear polymer of allyl methacrylate has pendent from the linear chain a substantial plurality of allyl groups which remain available for further reaction whenever the opportunity and conditions present themselves. These polymers of allyl methacrylate are well-known in the art and are available commercially. Attention is directed to the U.S. Patent 2,361,055 which is incorporated herein by reference and which shows the method for the preparation of polymers of allyl methacrylate. In using the polymer of allyl methacrylate to coat the plastic base, one should utilize a solvent for the polymer which can be fairly readily removed by heating to a temperature approximating the boiling point of the solvent wherein said boiling point is below the softening temperature of the plastic body being coated. Among those solvents suitable for this purpose are chloroform, methylene chloride, ethylene chlorohydrin 2-chloro-ethanol, trichlorofluoromethane, other halocarbon liquids and the like. The amount of solids of poly(allyl methacrylate) dissolved in the solvent should be between about 0.25% and 5.0% and preferably between about 0.5% and 1% by weight based on the weight of the solution.

With respect to the surfacing material used to impart the mar-resistant characteristic to the plastic base in the present invention, reference is made to the copending application Ser. No. 307,812, filed Sept. 10, 1963, now United States Patent No. 3,264,372, issued Aug. 2, 1966 in the names of Deichert and Webb. In the aforesaid application, there is set forth a disclosure of substantially linear, water-insoluble, non-gelled, unsaturated polyester resin composition which is used as the surfacing component in the present invention. These earlier polyester resin compositions impart to the substrates to which they are applied markedly improved mar-resistant properties in those instances when the substrates has a deficiency in mar-resistance. When the plastic substrate, is coated with the polyester resin composition used in the present invention without benefit of the poly(allyl methacrylate) binding agent, the bonding of the polyester resin film to the substrate is less secure and has a poorer degree of bond as measured by the Scotch tape grid test than a comparable plastic base which has the binding agent of the polymer of allyl methacrylate applied thereto.

The substantially linear, water-insoluble, non-gelled, unsaturated polyester resin composition used to impart the mar-resistant surface in the present invention comprises a blend of two principal components, namely certain fumaric acid glycol polyester resins and certain glycol diacrylates. If desired, comparatively small amounts such as about 1–5% of a polymerizable styrene can be used with the two principal components to dimish tendencies for haze development. Insignificant amounts of other additives which have no serious detrimental effect on the properties of the ultimate product produced are also within the contemplations of the present invention.

The first component used in the surfacing resin of the present invention is the esterification reaction product produced by reacting components consisting essentially of fumaric acid and a polyglycol wherein said glycol contains between 6 and 26 carbon atoms. The esterification reaction between the fumaric acid and the polyethylene glycol is carried out until an acid number below about 30 is reached.

Among the polyethylene glycols which may be used to esterify the fumaric acid are triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol and tridecaethylene glycol. These polyethylene glycols may be used either singly or in combination with one another. In the practice of the process of the present invention relating to the preparation of this polyester resin composition, the fumaric acid and the polyethylene glycol will be used in substantially equimolar proportions, since each is, for the purposes of esterification, difunctional. For preferred processing results, a slight excess amounting to about 5 to 20% of the polyethylene glycol should be used over and beyond the amount stoichiometrically calculated to esterify substantially all of the carboxyl groups in the fumaric acid.

The second component used in the surfacing composition of the present invention, namely the glycol diacrylates, are prepared by esterifying an alpha, beta, ethylenically unsaturated monocarboxylic acid selected from the group consisting of acrylic acid and methacrylic acid with a glycol selected from the group consisting of polyglycols having from 4 to 8 carbon atoms and monoglycols containing from 2 to 4 carbon atoms. Among the polyglycols which may be used to produce the glycol diacrylates are diethylene glycol, triethylene glycol, tetraethylene glycol, dipropylene glycol, bis(4-hydroxybutyl)ether polyethylene glycol having a molecular weight of about 200 and the like. Among the monoglycols which may be used to esterify the acrylic acids are ethylene glycol, propyleneglycol, and the propanediols-1,2 and 1,3 and the butanediols-1,2; 1,3; and 1,4. These glycol diacrylates can be used with glycol fumarates either singly or in combination with one another. However, whether used singly or in combination, the glycol diacrylate should be present in the total composition in an amount varying between about 10% and 40% by weight based on the total weight of said glycol fumarate and said glycol diacrylate.

It has been pointed out hereinabove that the substantially linear, water-insoluble, non-gelled unsaturated polyester resin composition of the present invention can be converted to a hard mar-resistant product. This conversion thermost state can be accomplished by the application of from the ungelled or thermosetting state to the hard heat and/or pressure with or without catalysis. Still further the thermosetting material can be converted to the thermost state by use of catalysts or initiators only without resorting to either heat or pressure. The catalytic materials or polymerization initiators which would be used to make such a conversion in state are well-known in the art and have been used extensively for this purpose. Illustrative catalysts are the peroxide catalysts such as, benzoyl peroxide, tertiary butyl hydroperoxide, ditertiary butyl peroxide, and cumene hydroperoxide, among many others. The ketone peroxides may also be used such as, the methyl ethyl ketone peroxide, the diethylketone peroxide and the like. The amounts of the catalytic material used will be conventional such as between about 0.01% and 10% and more usually between about 0.1% and 3% by weight based on the weight of the polymerizable composition.

It has been indicated hereinabove that if desired to eliminate a tendency towards haziness in the surfacing composition used in the present invention, one may make a further modification by adding to the two principal components a polymerizable styrene in amounts varying between about 1% and 5% by weight based on the total weight of the glycol fumarate, the glycol diacrylate and the styrene. Preferably, one would use about 3% by weight of said styrene, same basis. Among the polymerizable styrenes which may be used in the composition of the present invention are styrene per se, side chain and ring substituted halo and/or alkyl styrenes such as a-chlorostyrene, a-methylstrene, o-, m-, p-methyl styrenes, o-, m-, p-chlorostyrenes, 2,4-dimethylstyrene, 2,5-dimethylstyrene, 2,3-dichlorostyrene, 2,4-dibromostyrene and the like. Since the presence of a halo substituent on a styrene compound may have a tendency to impart a slight yellowness to the ultimate cured object, these halo-substituted styrenes should be avoided particularly when the ultimately produced object will be used in an area where clarity and water whiteness is desired. When a polymerizable styrene monomer is also used in the composition, the same thermosetting characteristic prevails and conversion to the hard thermost state is accomplished in the same manner as before.

The coated plastic articles produced according to the process of the present invention will have a plurality of designed end uses such as transparent panels to be used as windowpanes, television implosion shields, optical lenses such as eyeglasses, including sunglasses, binocular, telescopes and the like. If desired, the polyester resin compositions of the present invention may have incorporated therein, ultraviolet light absorbers of which a substantial plurality are well known in the art. A significant number of these ultraviolet absorbers are disclosed in the Day et al. U.S. Patent 2,777,828. The amounts used are now conventional and are set forth in the aforementioned reference. If desired, particularly for show-window purposes and sunglasses, photochromic materials may be incorporated into the polymerizable resin of the present invention thereby permitting changes from a colored glass to a clear glass and vice versa, due to the absence or presence of light, including sunlight. If a permanent coloration is desired in the polymerizable polyester resins of the present invention, that will not defeat the principle desired end use, namely, transparency, certain dyes and/or pigments may be dissolved in the unsaturated polymerizable polyester resin in order to achieve a tinting.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

A cast sheet of poly(methyl methacrylate) is coated with a ½% solution of poly(allyl methacrylate) dissolved in chloroform. The coated sheet is warmed so as to evaporate the chloroform. Thereafter, a polyester composition comprising 80 parts of triethylene glycol fumarate and 20 parts of polyethylene glycol dimethacrylate catalyzed with a mixture of one part of a 60% solution of methylethyl ketone peroxide in dimethyl phthalate, one part of benzoyl peroxide, .0005 part of cobalt as cobalt naphthanate and 0.003 part of calcium as calcium naphthanate, is poured onto the coated poly(methyl methacrylate) sheet. The resulting coated sheet is placed between two layers of plate glass and clamped together to form a unitary structure. The entire assembly is held at 150° C. for one hour. On cooling, the glass plates are removed and the surface tested for mar-resistance and bond strength. The mar-resistance was extremely high and the bond was excellent as measured by the Scotch tape grid test.

The mar-resistance was 1 as measured by a mar tester. None of the coating was removed by the Scotch tape grid test. Haze was 0.9%. The mar-resistance of an uncoated sheet of polymethylmethacrylate using the same mar-tester is >30.

Example 2

Example 1 is repeated in substantially all details except that the polyester resin composition contains additionally about 3 parts of monomeric stylene. The mar-resistance of the ultimate coated article is extremely high and the bond test was excellent as measured by the Scotch tape grid test.

The mar-resistance was 1 as measured by a mar tester. None of the coating was removed by the Scotch tape grid test. The haze value on the finished product was 0.2%.

The Scotch tape grid test is accomplished by scratching the finished surface through, with a sharp point in a series of parallel lines about 1/16" apart and then with a similar series at right angles to the first series and also spaced 1/16" apart. A piece of No. 600 cellophane tape is firmly pressed into contact with the coated surface so as to cover the scratched lines. When the tape is pulled off quickly, no peeling of the coated surface will be observed if the bonding is excellent. Slight removal of the finish at the edges of the scratches is permissible without affecting the bonding reading.

We claim:

1. A process for improving the mar-resistance of a rigid plastic sheet and also improving the bonding of the surface layer to said sheet comprising coating a rigid plastic sheet with a solution of substantially linear polymer of allyl methacrylate, heating the coated sheet to remove the solvent, coating the thus coated sheet with a substantially linear, water-insoluble, non-gelled unsaturated polyester resin composition comprising a blend of (1) the esterification reaction product of reactants consisting essentially of fumaric acid and a polyethylene glycol wherein said glycol has been 6 and 26 carbon atoms, said product has an acid number below about 30 and (2) a glycol diacrylate which is the reaction product of a glycol selected from the group consisting of polyglycols having from to 8 carbon atoms and monoglycols containing from 2 to 4 carbon atoms, inclusive, and an acid selected from the group consisting of acrylic acid and methacrylic acid wherein (2) is present in an amount varying between about 10% and 40% by weight based on the total weight of (1) and (2) and converting said polyester resin to the thermoset state.

2. The process according to claim 1 in which the glycol diacrylate is ethylene glycol dimethacrylate.

3. A process for improving the mar-resistance of a rigid plastic sheet and also improving the bonding of the surface layer to said sheet comprising coating a rigid plastic sheet with a solution of substantially linear polymer of allyl methacrylate, heating the coated sheet to remove the solvent, coating the thus coated sheet with a substantially linear, water-insoluble, non-gelled unsaturated polyester resin composition comprising a blend of (1) the esterification reaction product of reactants consisting essentially of fumaric acid and a polyethylene glycol, wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) a polymerizable styrene in an amount varying between about 1% and 5% by weight based on the total weight of (1), (2) and (3) and converting said polyester resin to the thermoset state.

4. The process according to claim 3 in which the glycol diacrylate is ethylene glycol dimethacrylate.

5. A rigid plastic body having a mar-resistant surface comprising a rigid plastic base sheet having a coating on at least one surface thereof of a binding agent comprising a substantially linear polymer of allyl methacrylate, superimposed on said bonding agent layer is a cured layer of a hard, mar-resistant, cross-linked unsaturated polyester resin composition comprising the cured reaction product of (1) the esterification reaction product of reactants consisting essentially of fumaric acid and a polyethylene glycol wherein said glycol has between 6 and 26 carbon atoms and said product has an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (2) is present in an amount varying between about 10% and 40% by weight based on the total weight of (1) and (2).

6. The rigid plastic body according to claim 5 in which the glycol diacrylate is triethylene glycol dimethacrylate.

7. The rigid plactic body according to claim 5 in which the glycol diacrylate is tetraethylene glycol dimethacrylate.

8. A rigid plastic body having a mar-resistant surface comprising a rigid plastic base sheet having a coating on at least one surface thereof of a binding agent comprising a substantially linear polymer of allyl methacrylate, superimposed on said bonding agent layer is a cured layer of a hard, mar-resistant, cross-linked unsaturated polyester resin composition comprising the cured reaction product of (1) the esterification reaction product of reactant consisting essentially of fumaric acid and a polyethylene glycol, wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

9. A rigid plastic body according to claim 8 in which the glycol diacrylate is ethylene glycol dimethacrylate.

References Cited

UNITED STATES PATENTS

| 2,320,536 | 6/1943 | Pollack et al. | 117—138.8 |
| 2,361,055 | 10/1944 | Pollack | 260—89.5 |
| 3,264,372 | 8/1966 | Deichert et al. | 117—138.8 |
| 3,304,196 | 2/1967 | Deichert et al. | 117—76 |

MURRAY KATZ, *Primary Examiner.*

WILLIAM D. MARTIN, *Examiner.*

R. HUSACK, *Assistant Examiner.*

UNITED STATES PATENT OFFICE
CERTIFICATE OF CORRECTION

Patent No. 3,387,988                                              June 11, 1968

Darwin Fiske De Lapp et al.

It is hereby certified that error appears in the above numbered patent requiring correction and that the said Letters Patent should read as corrected below.

Column 1, line 53, "plyethylene" should read -- polyethylene --. Column 3, lines 55 and 56, "thermost state can be accomplished by the application of from the ungelled or thermosetting state to the hard" should read -- from the ungelled or thermosetting state to the hard thermoset state can be accomplished by the application of --; line 59, "thermost" should read -- thermoset --. Column 4, line 11, "α-methylstrene" should read -- α-methylstyrene --; line 22, "thermost" should read -- thermoset --. Column 5, line 9, "stylene" should read -- styrene --; line 28, "mar-reststance" should read -- mar-resistance --; line 42, after "from" insert -- 4 --. Column 6, line 39, "reactant" should read -- reactants --.

Signed and sealed this 11th day of November 1969.

(SEAL)
Attest:

EDWARD M. FLETCHER, JR.                              WILLIAM E. SCHUYLER, JR.
Attesting Officer                                           Commissioner of Patents